Sept. 12, 1950     E. S. GREENE     2,522,365
EXTRUSION MACHINE CYLINDER
Filed Jan. 7, 1949
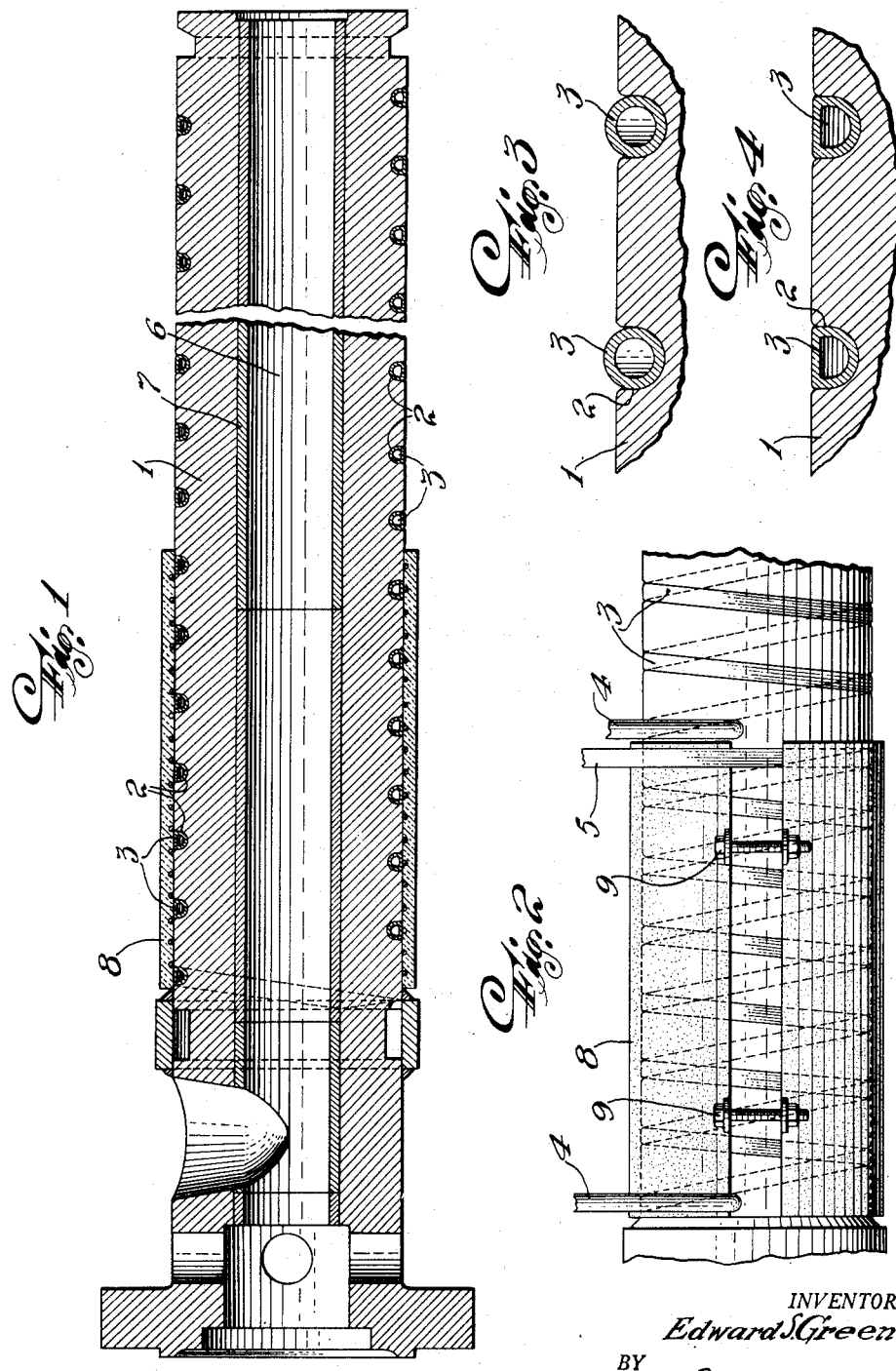
INVENTOR.
Edward S. Greene
BY
ATTORNEY Patented Sept. 12, 1950

2,522,365

UNITED STATES PATENT OFFICE 2,522,365

EXTRUSION MACHINE CYLINDER

Edward S. Greene, Union, N. J.

Application January 7, 1949, Serial No. 69,650

2 Claims. (Cl. 219—39)

This invention relates to a method and means for controlling the temperature of an extrusion machine cylinder or the like. Its purpose is to place the contents of a thick walled cylinder under regulated temperature control and is particularly adapted for use with rubber or plastic extrusion machines.

One object of this invention is to facilitate the economical incorporation of temperature control means in such a cylinder or barrel of conventional construction and size with a minimum of parts and of maintenance in use.

Another object is to permit the control of temperature in each of several sections of a cylinder.

A still further object is to provide a cylinder with heating and cooling means and leave its external surface smooth and in its original size and contour.

Other objects will appear from the description which follows.

The invention is illustrated in the accompanying drawing in which

Figure 1 is a longitudinal sectional view of a cylinder embodying this invention.

Figure 2 is a view of a portion of the cylinder of Figure 1, showing an electric band heater attached.

Figure 3 is an enlarged section of the cylinder of Figure 1 prior to rolling the tubing into final position and form.

Figure 4 is a section of Figure 3 after the tubing is secured in place.

Referring to the figures in which the same numbers refer to the same or similar parts, a detailed description of this invention is as follows. Metal, thick walled cylinder 1 of an extrusion machine contains liner 7 and has bore 6 running its length. In this bore a worm, which is not shown, turns and delivers rubber or plastic material under heat through the length of the cylinder from one end to another. The exterior surface of cylinder 1 is provided with a spiral groove 2 running the length of the barrel in which is seated conduit 3. If the cylinder is to be made subject to zone temperature control, conduit 3 will not be continuous but will be sectionalized by having inlets 4 and outlets 5 as shown defining the zone to be heated or cooled between them. Conventional couplings may be attached to inlet 4 and outlet 5 to connect them to a source of supply and to a recovery tank or receptacle.

A convenient method of assembling the conduit to the cylinder is to lay a suitable sized copper or other flexible, heat conducting tubing in groove 2 with inlets and outlets placed as desired. After the tubing is laid in the spiral groove 2, as shown in Figure 3, it is pressed or rolled so that it deforms and fills the groove with its flattened portion lying in the same cylindrical plane as the exterior surface of cylinder 1 as shown in Figure 4. By adopting a proper groove and tube size a press fit engagement will be obtained and the tube will completely fill and be firmly held in place in groove 2 flush with the exterior surface of cylinder 1.

It is obvious that grooving of the cylinder and application of tubing as described may be made for any of the conventional sizes of cylinder used which currently, for most extrusion machines, vary from one to eight inches in diameter and have one to two inches of wall thickness with lengths running up to one hundred inches. The diameter of the tubing, groove depth, and spacing may be varied depending upon the several factors involved. Normally tubing one-quarter to one inch in diameter will be found to be the most popular size. While a circular groove has been shown, it is obvious that any one of a variety of cross sectional forms may be employed just so long as the tubing may be pressed therein to afford a continuous conduit with an unbroken top flush with the exterior surface of the cylinder.

The advantage of the flush surface is illustrated in Figure 2 which shows the exterior appearance of cylinder 1 with an electric band heater 8 secured over one section or zone of the cylinder. While only one section is shown so encircled, the entire length of the cylinder may be provided with electric band heaters if desired. Electric band heater 8 is customarily used on cylinders of extrusion machines to electrically heat a desired portion thereof. The heater as shown consists of a split cylindrical band hinged to permit it to be placed about cylinder 1 and secured in place by bolts 9 or in any other conventional manner. Resistance wire in the band is connected to a suitable source of electric supply and current passing through this wire raises the cylinder and enclosed contents to approximately the temperature desired. By introducing a heat transfer medium into the inlet 4 and passing it through conduit 3 accurate control of the heat being transferred to the contents of cylinder 1 can be exercised. It should be noted that where the two halves of the electric band heater 8 are joined, there is an open gap which accommodates inlets 4 and outlets 5.

The method of controlling the temperature of material in a cylinder by the use of this invention is as follows. Oil, water, gas or steam may be admitted at a predetermined temperature from a suitable heat source through conventional couplings into inlets 4 passed through conduit 3 and be permitted to escape from outlets 5. Control of the temperature of the contents of cylinder 1 can be closely regulated by careful control of the temperature of the heat transfer medium that is circulated through conduit 3 in its several zones. Such material may thus be held to close limitation of temperature and subjected to different temperatures at different stages of its passage through the cylinder.

As pointed out before, in combination with electric band heaters high temperatures may be secured with accurate control and it is not uncommon with this invention to secure temperatures as high as 700° F. and to hold such high temperature within a very close tolerance.

It is obvious that this invention may take many different forms and it is not intended by this description to limit the scope of such invention or its application. It may, for example, be employed with any type of thick walled cylinder through which it is desired to control the flow of heat without adding to its outside dimensions. Injection molding machines may also employ this invention. Other applications for heat conducting tubing pressed into and filling a groove in a cylinder wall will also suggest themselves.

What I claim is:

1. Means for heating and controlling the flow of heat through the wall of a thick-walled hollow cylinder comprising in combination, a spiral groove in the exterior surface of the cylinder filled with a tube whose external surface is flush with the exterior surface of the cylinder and through which a heat transfer medium may be circulated, and an electric heater clamped about said cylinder.

2. Means for selectively heating and controlling the flow of heat through the wall of a cylinder in each of several zones of such cylinder, comprising a spiral groove in the exterior surface of the cylinder; a length of tube press fitted in such groove in each of said zones with its exposed surface flush with the exterior surface of the cylinder and with an upstanding end adjacent each boundary of the zone in which it lies; a heat transfer medium in each of such lengths of tube; and an electric heater clamped about each of such zones.

EDWARD S. GREENE.

REFERENCES CITED

The following references are of record in the file of this patent:

UNITED STATES PATENTS

| Number | Name | Date |
| --- | --- | --- |
| 1,162,537 | Yager | Nov. 30, 1915 |
| 1,419,225 | Colebrook | June 13, 1922 |
| 1,622,951 | Lewis | Mar. 29, 1927 |
| 2,174,319 | Gastrow | Sept. 26, 1939 |
| 2,359,013 | Tucker | Sept. 26, 1944 |
| 2,385,542 | Rippingille | Sept. 25, 1945 |
| 2,462,511 | Kramer | Feb. 22, 1949 |